(12) United States Patent (10) Patent No.: US 9,203,466 B2
Gorokhov et al. (45) Date of Patent: Dec. 1, 2015

(54) ACQUISITION PILOTS FOR WIRELESS COMMUNICATION SYSTEMS

(75) Inventors: Alexei Gorokhov, San Diego, CA (US); Aamod Khandekar, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 12/446,679

(22) PCT Filed: Oct. 24, 2007

(86) PCT No.: PCT/US2007/082328
§ 371 (c)(1),
(2), (4) Date: Apr. 22, 2009

(87) PCT Pub. No.: WO2008/052026
PCT Pub. Date: May 2, 2008

(65) Prior Publication Data
US 2010/0027486 A1 Feb. 4, 2010

Related U.S. Application Data

(60) Provisional application No. 60/862,730, filed on Oct. 24, 2006.

(51) Int. Cl.
*H04W 4/00* (2009.01)
*H04B 1/7075* (2011.01)

(52) U.S. Cl.
CPC .... *H04B 1/7075* (2013.01); *H04B 2201/70701* (2013.01)

(58) Field of Classification Search
CPC ............................ H04B 1/7075; H04B 1/7077
USPC ....................................................... 370/328
See application file for complete search history.

(56) References Cited

U.S. PATENT DOCUMENTS 7,327,812 B2 * 2/2008 Auer .............................. 375/347
2005/0058089 A1 * 3/2005 Vijayan et al. ................ 370/312
(Continued)

FOREIGN PATENT DOCUMENTS

KR 20050041857 5/2005
WO 2005043791 5/2005

OTHER PUBLICATIONS

Jim Tomcik, IEEE 802.20 Working group on mobile broadband wireless access, MBFDD and MBTDD wideband Mode: Technology Overview, Jan. 6, 2001, entire document.*
(Continued)

*Primary Examiner* — Maharishi Khirodhar
(74) *Attorney, Agent, or Firm* — Stanton Braden; Michael J. DeHaemer

(57) ABSTRACT

System(s) and method(s) are provided to facilitate generating and processing acquisition pilots in wireless communications. Acquisition pilots that convey timing and frequency synchronization information, wireless system acquisition and system determination information are modulated with pseudorandom sequences. The R bits of information carried by the acquisition pilot that conveys system determination information are augmented with T bits that convey a counter index associated with the system timing of superframes transmitted from an access point. The processing overhead resulting from the addition of the T bits is offset by the advantages afforded to a wireless communication. Salient advantages include: (i) processing gain at a receiver for communication in a specific sector during asynchronous operation, (ii) packet boundary determination through the counter field values, and (iii) initialization of various pseudorandom registers employed for communication.

48 Claims, 13 Drawing Sheets

(56) References Cited

U.S. PATENT DOCUMENTS

| | | | |
|---|---|---|---|
| 2005/0120097 A1* | 6/2005 | Walton et al. | 709/220 |
| 2005/0147025 A1* | 7/2005 | Auer | 370/203 |
| 2005/0281290 A1* | 12/2005 | Khandekar et al. | 370/500 |
| 2006/0062196 A1* | 3/2006 | Cai et al. | 370/345 |
| 2006/0063524 A1* | 3/2006 | Hwang | 455/423 |
| 2006/0203708 A1 | 9/2006 | Sampath et al. | |

OTHER PUBLICATIONS

Jim Tomcik and Radhakrishna Canchi, IEEE 802.20 Working group on mobile broadband wireless access, MBFDD and MBTDD wideband Mode: Proposed draft interface specification, Jan. 6, 2001, entire document.*

Written Opinion—PCT/US07/082328, International Search Authority—European Patent Office—May 19, 2008.

International Search Report—PCT/US2007/082328, International Search Authority—European Patent Office—May 19, 2008.

International Preliminary Report on Patentability—PCT/US07/082328, The International Bureau of WIPO—Geneva, Switzerland—Apr. 28, 2009.

Taiwan Search Report—TW096139902—TIPO—Nov. 14, 2012.

Taiwan Search Report—TW101122692—TIPO—Jul. 16, 2014.

Taiwan Search Report—TW096139902—TIPO—Oct. 31, 2012.

* cited by examiner

ACQUISITION PILOTS FOR WIRELESS COMMUNICATION SYSTEMS

CROSS-REFERENCE TO RELATED APPLICATION

This application claims the benefit of U.S. provisional application Ser. No. 60/862,730 filed on Oct. 24, 2006, and entitled "ACQUISITION PILOTS FOR WIRELESS COMMUNICATION SYSTEMS." The entirety of this application is incorporated herein by reference.

BACKGROUND

I. Field

The following description relates generally to wireless communications, and more particularly to generation of acquisition pilots that provide enhanced communication functionality through the inclusion of an additional multi-bit field.

II. Background

Technologies utilized for transmitting information within a mobile communication network (e.g., a cell phone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between access points and mobile terminals or between mobile terminals can take place after a terminal has "acquired" a base station serving a coverage sector. Typically, in an acquisition processes a terminal accesses the necessary system information to communicate with the serving base station. As terminals enter and leave a sector without a specific pattern, acquisition information is frequently transmitted by the sector. The latter imposes a significant overhead in a wireless system. Therefore, a need exist in the art to develop acquisition mechanisms that make the acquisition process more effective regardless of ubiquitous overhead.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, it is disclosed a method for generating acquisition pilots in a in a wireless communication system, comprising: generating an acquisition pilot of N bits of information, wherein T bits of information correspond to a counter index, N and T being positive integer numbers; and conveying the acquisition pilot.

In another aspect, the subject disclosure describes an apparatus that operates in a wireless communication system, the apparatus comprising: at least one processor configured to generate an acquisition pilot sequence, wherein a portion of a modulated information includes a counter field value associated with a superframe transmission; and a memory coupled to the at least one processor.

In yet another aspect, it is disclosed a wireless communication device comprising: means for generating a first acquisition pilot sequence carrying N bits of system determination information and T bits of a wireless communication system superframe index; means for scrambling a second acquisition pilot sequence with the information carried in the first acquisition pilot sequence; and means for conveying the first and second acquisition pilot sequences.

In a further aspect, the subject specification discloses a computer program product, comprising a computer-readable medium comprising: code for causing at least one computer to generate an acquisition pilot sequence comprising N bits of information, wherein T bits of information correspond to a counter field value; and code for causing at least one computer to convey the acquisition pilot.

With respect to receiving a wireless transmission in connection with acquisition pilots and processing thereof, it is disclosed in an aspect a method for processing acquisition pilots in a wireless communication system, the method comprising: receiving a plurality of pilot acquisition sequences; and processing the plurality of pilot acquisition sequences to extract system determination information.

In another aspect, it is disclosed a computer program product, comprising a computer-readable medium comprising: code for causing at least one computer to receive a plurality of pilot acquisition modulation sequences; and code for causing at least one computer to decode the plurality of pilot acquisition modulation sequences to extract system determination information.

In yet another aspect, a wireless communication device is disclose, the device comprising: at least one processor configured to receive a pilot acquisition sequence that carries system determination information and T bits of a wireless communication system superframe index, to process the pilot acquisition sequence, and to extract the information; and a memory coupled to the at least one processor.

In a further aspect, it is disclosed an apparatus that operates in a wireless communication environment, the apparatus comprising: means for receiving successive pilot and control modulation sequences; means for processing the modulation sequences to materialize processing gains; and means for determining packet boundaries of the received modulation sequence.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
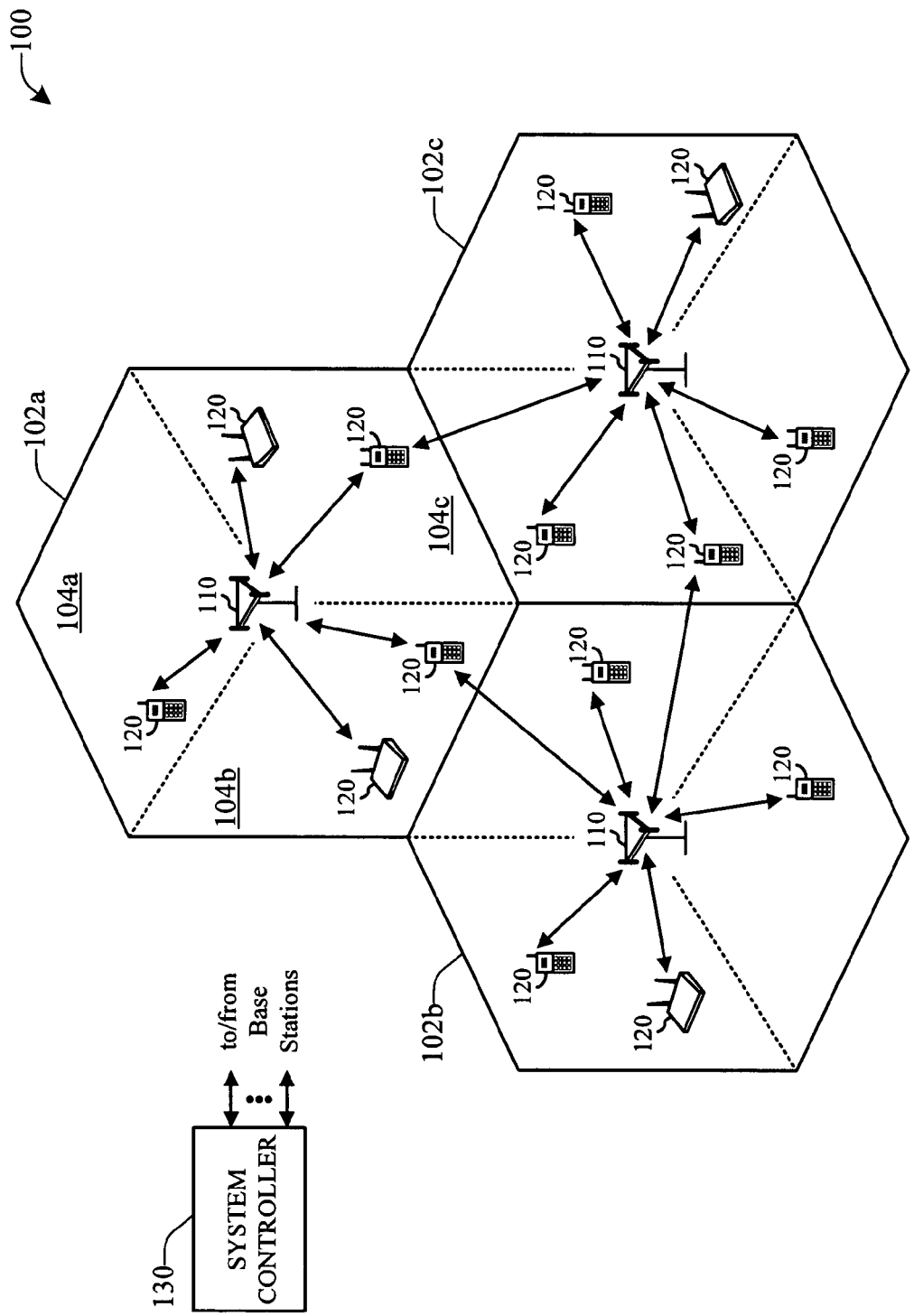
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, customer premises equipment, or user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

Hereinafter, system(s) and method(s) to facilitate generating and processing acquisition pilots in wireless communications are discussed. Acquisition pilots that convey timing and frequency synchronization information, wireless system acquisition and system determination information are modulated with pseudorandom sequences. A number of bits of information carried by the acquisition pilot that conveys system acquisition information is augmented with T bits that convey a counter index value associated with the system time of superframes transmitted from an access point. The processing overhead resulting from the addition of the T bits is offset by the advantages afforded to a wireless communication. As described below, salient advantages include: (i) processing gain at a receiver for communication in a specific sector during asynchronous operation, (ii) packet boundary determination through the counter index values, and (iii) initialization of various pseudorandom registers employed for communication.

Referring now to the drawings, FIG. 1 is an illustration of a wireless multiple-access communication system 100 in accordance with various aspects disclosed in the subject specification. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown).

As used herein and generally in the art, the term "sector" can refer to a BTS and/or its coverage area depending on the context in which the term is used. In one example, sectors 104a, 104b, 104c in a cell 102a, 102b, 102c can be formed by groups of antennas (not shown) at base station 110, where each group of antennas is responsible for communication with terminals 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

In accordance with an aspect, system 100 can employ centralized scheduling via one or more schedulers implemented at, for example, system controller 130 and/or each base station 110. In a system utilizing centralized scheduling, scheduler(s) can rely on feedback from terminals 120 to make appropriate scheduling decisions. In one example, this feedback can include an offset added to the OSI information in order to allow the scheduler to estimate a supportable reverse link peak rate for a terminal 120, from which such feedback is received, and to allocate system bandwidth accordingly.

Figure 2:
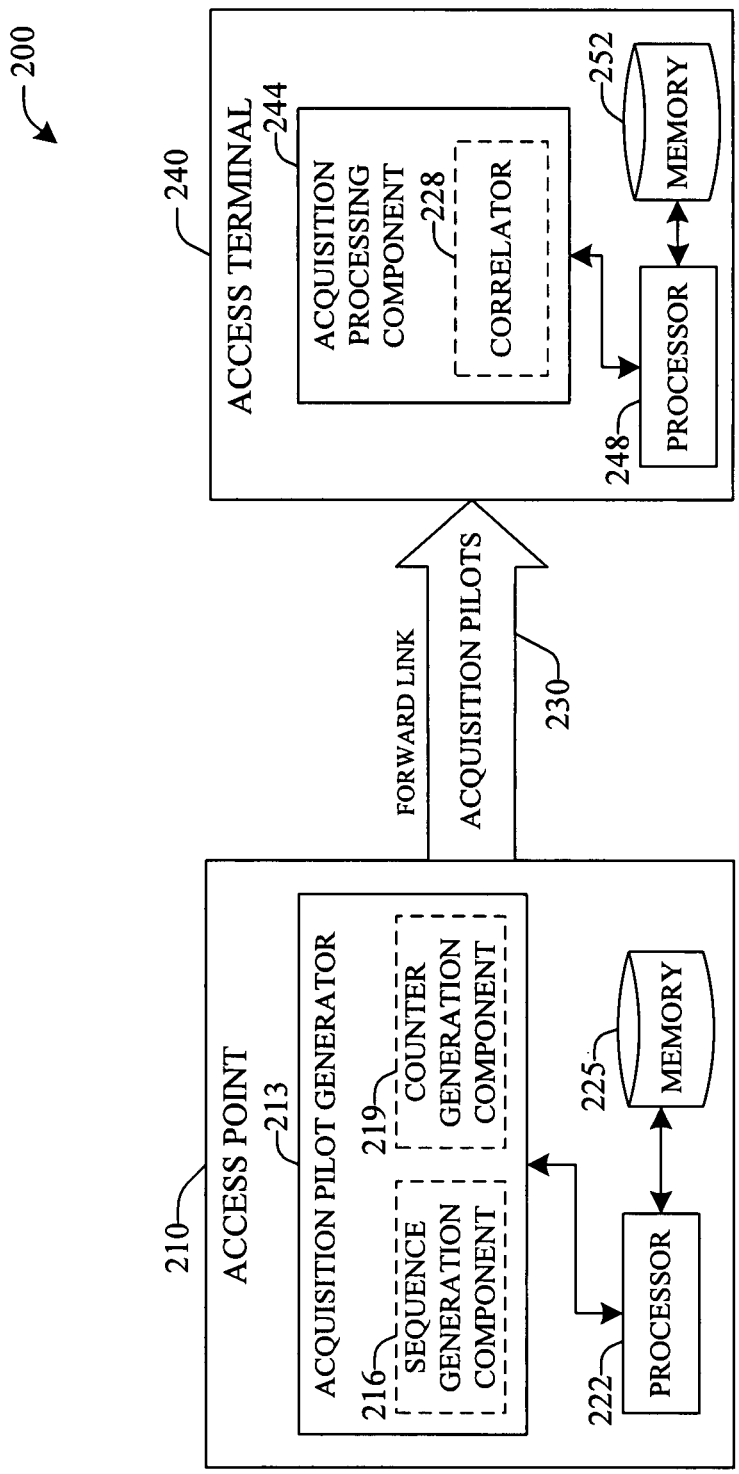
FIG. 2 is a block diagram of a system that facilitates generation and processing of acquisition pilots in accordance with various aspects of the subject innovation.

FIG. 2 is a block diagram of a system 200 that facilitates generation and processing of acquisition pilots that afford system determination and enhanced functionality at the terminal side. Access point 210 generates acquisition pilots through acquisition pilot generator component 213. Such pilots are part of a preamble of a communication system superframe, and are transmitted over a forward link 230 to an access terminal 240 that process them via acquisition processing component 244. Processing the pilots results in system determination, e.g., identification of operational parameters such as (i) system bandwidth, characterized by a FFT size in the case of a FDMA system; (ii) perforation profile in the case of perforated spectrum allocation; (iii) indication of time division duplex (TDD) or frequency division duplex (FDD), with further indication of specific TDD partitioning and FDD half duplex (the latter further carries an indication of time guard intervals as well as frequency-domain guard interval for forward link and reverse link); (iv) cyclic prefix length (in UMB, for example, four values are possible); (v) indication of synchronous or asynchronous operation; (vi) frequency reuse; (vii) sector/cell identification; and (viii) antenna configuration at access point (e.g., 210). It should be appreciated that the manner in which information (i)-(vii) is conveyed through acquisition pilots affects the superframe preamble structure.

In accordance with an aspect of acquisition pilot generator 213, a sequence generation component 216 generates a series of bits that can contain portions, or the entirety, of the system search information (i)-(viii). Sequences can be pseudorandom codes, or pseudonoise sequences, or a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence). In addition, a counter generation component 219 introduces a T-bit counter (with T a positive integer number). The counter is added to the sequence that forms an acquisition pilot. In an aspect, the counter can become part of a seed employed to scramble a pilot symbol. In another aspect, the T-bit counter can be combined with one or more of the quantities (i)-(vii) to generate a V-bit integer. This V-bit integer can be used to select one of $2^V$ Walsh codes, or one of $2^V$ exponential codes, and so on. It should be appreciated that while adding a counter to an acquisition pilot increases communication overhead, such overhead is offset by the various performance and functionality advantages achieved through the addition of a T-bit counter. Example advantages are discussed and illustrated below.

Sequence generation component 213 relies in processor 222 to perform a portion of sequence generation, such as pseudorandom number generation, matrix manipulation involved in construction Walsh-Hadamard sequences, generation of GCL sequences, as well as initializing registers and storing generated sequences and updated counter values in a memory 225. In addition, processor 222 performs data manipulation necessary to communicate sequences and counter values, as well as control and data. In an aspect, in an FDMA system, processor 222 performs direct/inverse Fourier transformations (D/IFT), Hadamard transformation, and addition of cyclic prefixes to sequence, control, and data streams, as well as serial-to-parallel/parallel-to-serial manipulations. In a CDMA, scrambling of symbols is executed by processor 222. It should be appreciated that processor 222 can perform other actions related to communication of access point 210 with access terminal 240, such additional actions would be readily apparent to one of ordinary skill. Memory 225 stores code instructions/modules employed to generate sequences and counter values as well as for operations necessary to manipulate and transmit such sequences, control and data over forward link 230. By way of example and not limitation, according to aspects described herein, acquisition pilot TDM 2 in UMB can encompass 9 bits of PilotPN (sector indentifier) or PilotPhase, and acquisition pilot TDM 3 can contain 9 bits of system determination information (e.g., aforementioned items (i)-(viii) in addition to T bits of system time) which are further scrambled with the 9 bits of TDM 2.

Access point 210, can transmit information bits according to the manner in which the sequences were generated, such as via one of multiple orthogonal codes, or by pseudorandom scrambling of an initial pilot sequence, e.g, G bits can be transmitted by selecting one of 2G random scrambling sequences. In yet another aspect, bits can be transmitted within a hybrid approach, wherein N bits can be transmitted by selecting a Walsh code or substantially any other code, and P additional bits can be transmitted by scrambling the selected code by 1 out of $2^P$ pseudorandom sequences.

In connection with access terminal 240, an acquisition processing component 244 detects and decodes (or demodulates) acquisition pilots. In an aspect, bits that have been transmitted by an access point through selection of one out of several disparate orthogonal codes (e.g., Walsh-Hadamard, exponential, and so on), are decoded by correlating with each of the appropriate orthogonal, or non-orthogonal, sequences (e.g., code hypotheses). Such processing can generally be accomplished efficiently by employing a Hadamard transformation for Walsh-Hadamard sequences, and a fast Fourier transformation for exponential sequences. In another aspect, decoding involves descrambling various pilot sequences: bits that have been transmitted by employing a pseudorandom scrambling of an initial pilot sequence, e.g., 9 bits transmitted by adopting one of $2^9=512$ random scrambling sequences, can be decoded through descrambling with each of such 512 scrambling sequences. Alternatively, or in addition, decoding a scrambled sequence can be accomplished by utilizing scrambling sequences generated with a predetermined seed (e.g., a T bit positive integer such as a counter index associated with a communication superframe index; see below) with a purpose to descramble information transmitted in a pilot acquisition sequence. In connection with the aforementioned example of TDM 2 and TDM 3 in UMB, decoding of TDM 2 can be carried out employing a Walsh transformation, and system information in TDM 3 can be descrambled by exploiting TDM 2's information and a Walsh transformation to determine the system information in TDM 3.

As part of the acquisition, a component, correlator 248, correlates (temporally) disparate sequences to extract timing information (e.g., superframe, frame and symbol boundary detection), frequency synchronization, and other system information. Correlator 248 relies on processor 232 to perform temporal correlation as well as other operations such as IFFT. Disparate sequences can be received over multiples superframes or within a single superframe preamble, as discussed below. Repeated sequences sent over downlink 160 are detected by correlator 128, and timing metric is computed by processor 124. Timing and frequency synchronization methods such as Moose method, Van De Beenk method, and Schmidl method, propose particular code sequences with repeated sections of the transmitted bit series in order to estimate frame and subframe boundaries, as well as frequency offset. One skilled in the art would appreciate that other methods are possible for time correlation, superframe, frame, and symbol boundary detection; CP duration; and frequency synchronization. After timing and frequency synchronization, code sequences that carry sector identity and system information (e.g., bandwidth, TDD/FDD operation, frequency reuse) can be demodulated by access terminal 240 (see below) and system determination can be completed.

Figure 3:
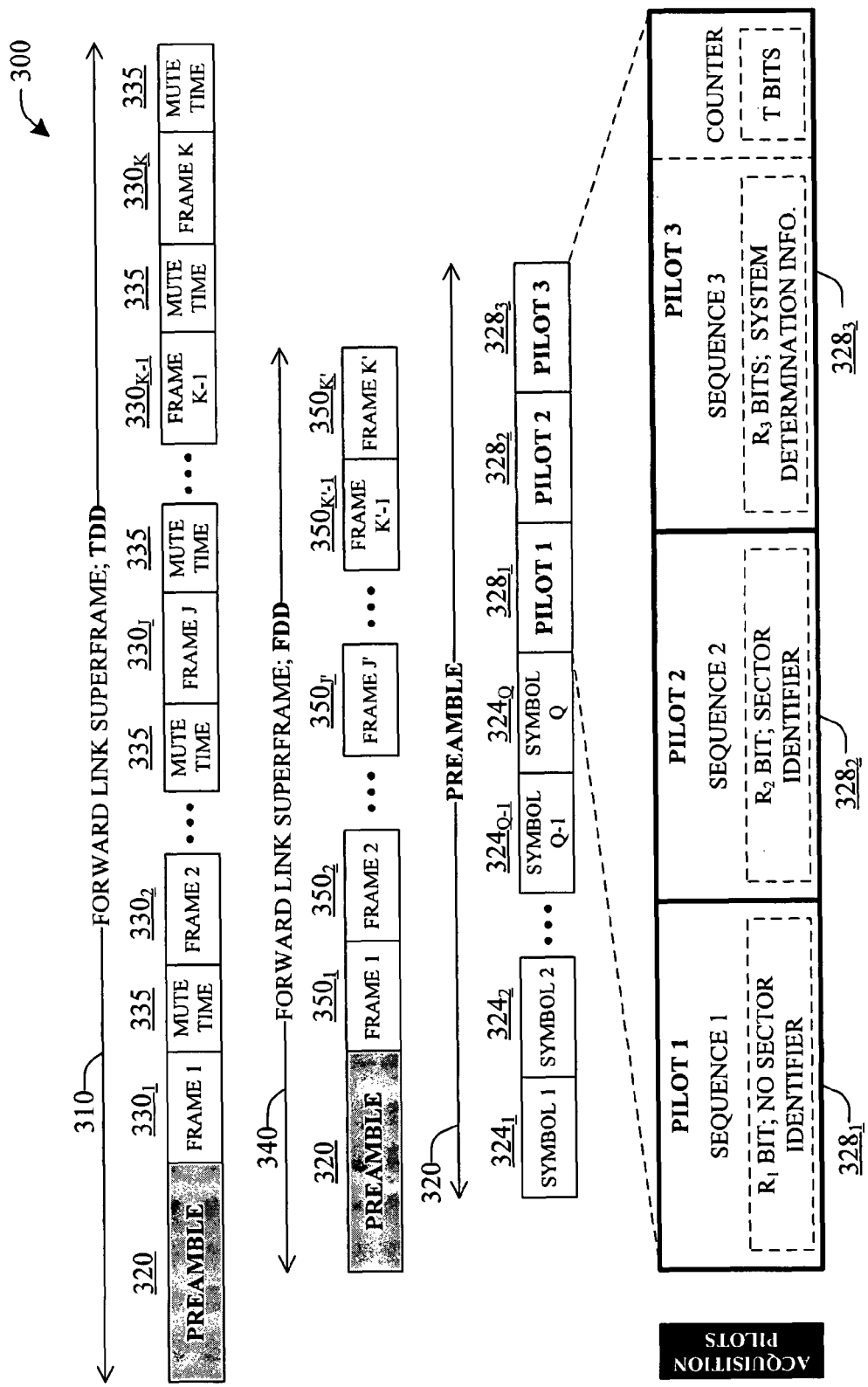
FIG. 3 is a schematic diagram of example time-domain structures of TDD and FDD forward link communication superframes, and an associated superframe preamble structure.

FIG. 3 is a schematic diagram 300 of example time-domain structures of TDD and FDD forward link communication superframes, and an associated superframe preamble structure. In both, TDD and FDD wireless communication, FL communication is divided in units of superframes, or radio frames. As illustrated, a superframe (e.g., 310 or 340) encompasses a preamble followed by a series of physical layer (PHY) frames. In FDMA systems (e.g., LTE, UMB), preamble (e.g., 320) and frames (e.g., $330_1$-$330_K$ or 3501-350K) typically carry a number of OFDM modulated symbols (not shown) and one or more cyclic prefixes (not shown) that mitigate inter-symbol interference arising from the wireless channel impulse response. Next, superframe structure 310 and 340 are described briefly, and preamble structure 320 is described in greater detail.

In an aspect, TDD superframe 310 comprises a preamble 320, and K frames $330_1$-$330_K$ with interspersed mute time intervals 335. Reverse link transmission takes place during such FL mute intervals. It should be appreciated that in TDD superframe 310, the ratio of FL frames to mute interval (or RL frames) is 1:1; however, this ratio can take on a value M:N, where M and N determine, respectively, the number of FL and RL frames transmitted sequentially. It is noted that TDD superframe 310 is adaptive, in that M and N values can vary within the superframe or among superframes. Such adaptation can be employed by an access terminal (or access network) to optimize FL and RL traffic. An indication to exploit such adaptation can be conveyed in the superframe preamble 320 (see below). It should be appreciated that in certain communication applications, traffic can primarily occur in the RL or FL. Downloading a file from an access network, through an access point (e.g., access point 210) is an example of FL-intensive traffic, whereas wireless videoconferencing can be either FL or RL intensive, depending on whether terminal users are in the delivery side or in the receive side of the data end.

In another aspect, FDD FL superframe encompasses a preamble 320 and K' frames $350_1$-$350_{K'}$. No mute intervals are present, as in this communication paradigm the available system bandwidth is partitioned for dedicated communication in the FL and RL, in such a manner that FL and RL transmissions do not mutually interfere. A guard interval ensures mitigation of undesired interference. As disclosed herein, the structure of preamble 320 is substantially the same as in the TDD case. Yet, it should be readily apparent that the contents of FDD and TDD preambles can be disparate.

In both TDD and FDD FL superframes, preamble 320 includes Q symbols $324_1$-$324_Q$ and P pilots $328_1$-$328_P$. It is noted that each symbol, as well as each pilot, can correspond to an OFDM symbol or two OFDM symbols depending on the preamble bandwidth; the specific numerology of such symbol(s) depends on the wireless communication system in which communication takes place. As an example, in UMB, the symbol spans a number $N_W$ of equally spaced ($\Delta v$=1.96 MHz) subcarriers ranging from $N_W=2^7=128$ for a bandwidth of 1.25 MHz or less to $N_W=2^{11}=2048$ for bandwidths greater than 10 MHz and lower than 20 MHz. Additionally, the duration of an OFDM symbol in UMB ranges from 114 μs to 133 μs, depending on cyclic prefix duration. It is noted that these values serve illustration purposes and should not be construed as a limitation to the preamble structure 320 or the numerology in connection therewith. Symbols $324_1$-$324_Q$ include pilot and control channels that can be employed for channel estimation (determination of CQI such as SNR, SINR, and so on), and a broadcast channel that comprises configuration information that an access terminal (e.g., access terminal 210) can utilize to demodulate information contained in FL frames $330_1$-$330_K$ or $350_1$-$350_{K'}$. Further information that can be included in preamble 320 comprises timing and other information which enables an access terminal to communicate on a system (sub)carrier, such as indication of system bandwidth, synchronous/asynchronous operation, frequency reuse, antenna configuration at sector transmitter. Moreover, indication of other sector interference and power level control or power spectral density control or offsets for interference mitigation can be conveyed in preamble 320. Furthermore, paging information can also be carried in a superframe preamble. It should be appreciated that the above information can be conveyed over multiple preambles 320.

In an aspect, pilots $328_1$-$328_3$ can be employed for system determination and acquisition. Referring to FIG. 3, three pilots are illustrated as acquisition pilots: pilot 1 $328_1$, pilot 2 $328_2$, and pilot 3 $328_3$. It should be appreciated that while aspects described herein are illustrated with three pilots, additional pilots can be conveyed in the superframe preamble 320 and utilized for system search and timing. Next, we discuss each of the acquisition pilots illustrated in FIG. 3, emphasizing their functionality. Pilot 1.—Carries a fixed sequence which remains the same across all sectors. The specific sequence carried by Pilot 1 depends on system bandwidth and other system characteristics, such as cyclic prefix. The subject acquisition pilot conveys timing and frequency synchronization information. In an aspect, the sequence corresponds to a frequency-domain GCL sequence. In addition, the number of possible sequences $N_{seq}$ can be dictated by the product of the possible number of bandwidths (n) that can be employed to convey the preamble 320 (e.g., preamble bandwidth) and the number (m) of CP duration hypothesis. In UMB, n=3 corresponding to bandwidths {1.25 MHz, 2.5 MHz, and 5 MHz} and m=4, the four possible CP lengths {6.5 µs, 13.0 µs, 19.5 µs, 26 µs}.

Pilot 2 $328_2$.—This pilot carries $R_2$ bits of sector specific identification, or sector identifier, e.g., in UMB, PilotN or PilotPhase, in Sequence 2. In an aspect, such sequence can be a time-domain Walsh-Hadamard sequence.

Pilot 3 $328_3$.—This pilot can be employed for system determination, which consist in acquiring information necessary for a terminal (e.g., 240) to demodulate the contents of the preamble itself (e.g, center frequencies for available bandwidth) in addition to an indication of synchronous/asynchronous deployment, a cyclic prefix indication, system bandwidth, frequency reuse, antenna information at access point in sector, and so on. Pilot 3 $328_3$ conveys $R_3$ bits of such information in addition to T bits of system time, e.g., a T-bit counter, in Sequence 3. The bit counter is increased when the access point transmits a superframe. It should be appreciated that system time is the time measured by the access network upon transmitting broadcast signals in the superframe. In an aspect, the counter value can be indicated as the T least significant bits (LSBs) of system time or a superframe index. The addition of T-bits can introduce processing overhead; however, the benefits derived from adding the T bits offset such processing cost, as discussed below.

In an aspect, Sequence 3 can be a Walsh-Hadamard sequence further scrambled with the information in Pilot 2 $328_2$. As pilot 2 $328_2$ carries sector identification (e.g., in UMB, PilotPN or PilotPhase) information, the scrambled Sequence 3 can be suitable for (a) sector acquisition, as the sector identifier is encoded (via scrambling) in Sequence 3, and (b) combination of realizations of Sequence 3 across superframes. Item (b) provides with the possibility of acquiring a sector even in poor channel conditions, as sequences can be accumulated over time in an access terminal (e.g., in acquisition processing component 244).

To summarize, pilot 1 $328_1$ can be employed for initial timing and frequency synchronization, pilot 2 $328_2$ can be utilized for sector identification, in either synchronous or asynchronous mode, and pilot 3 $328_3$ can be employed for system determination, and it can be enhanced through the introduction of a T-bit counter that can be employed to recover time-dependent superframe-to-superframe variation in the modulation of the $R_3$+T bits of information. It should be appreciated that the magnitude of T in the T-bit counter can be determined through a tradeoff analysis that incorporates communication technology (e.g., LTE, UMB) as well a communication deployment, such as single-user multiple-input multiple output (MIMO) or multi-user MIMO deployment, channel conditions (SINR, SNR), loading level and other-sector interference level in the sector being acquired, and so forth. By way of example, and not limitation, in a UMB communication system, T=4 affords operational benefits while maintaining a reasonable additional processing overhead for modulating $R_2$=9 bits, $R_3$=5, typical values for conventional acquisition, and $R_3$+T=9 bits.

Figure 4:
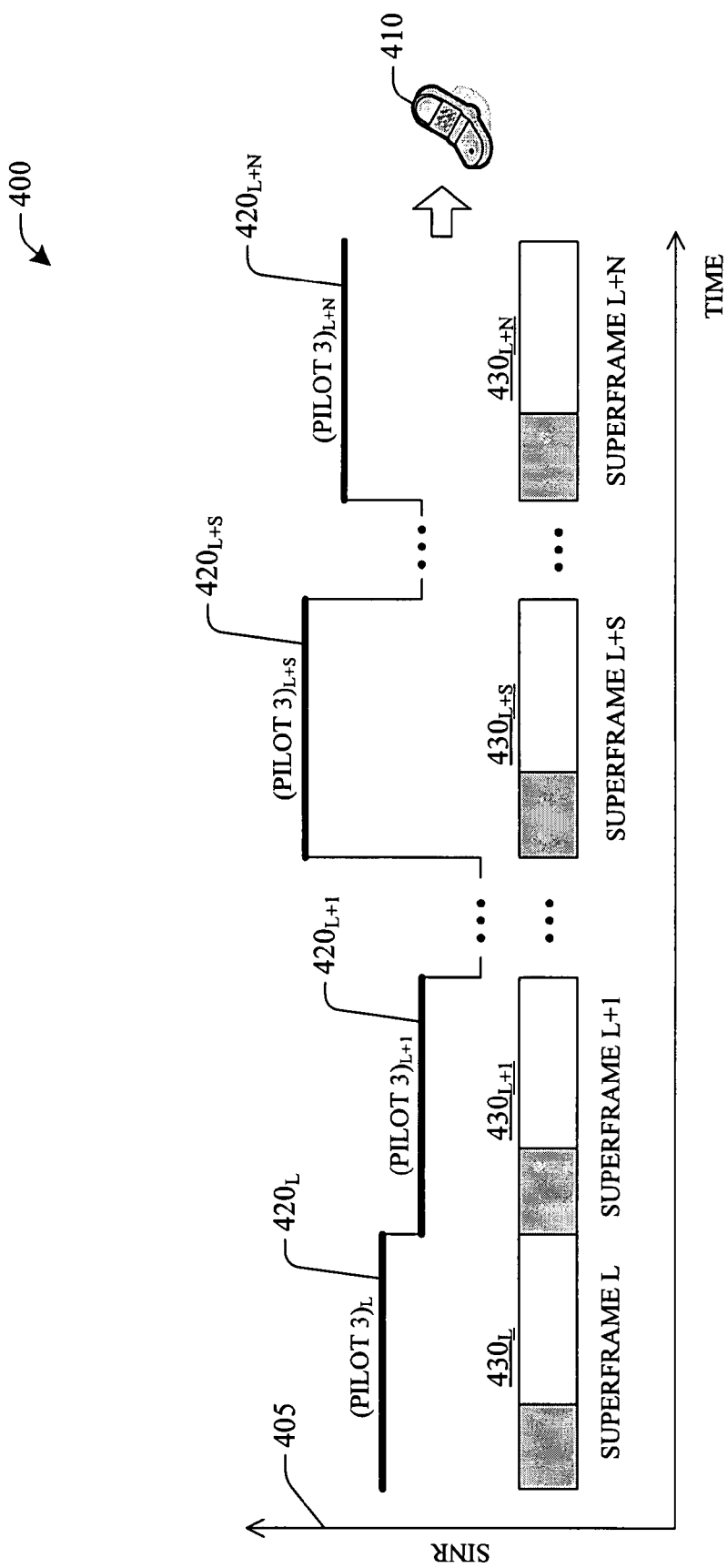
FIG. 4 is a schematic diagram that illustrates a processing gain in an access terminal that conducts sector acquisition and system determination according to an aspect of the subject disclosure.
Figure 5:
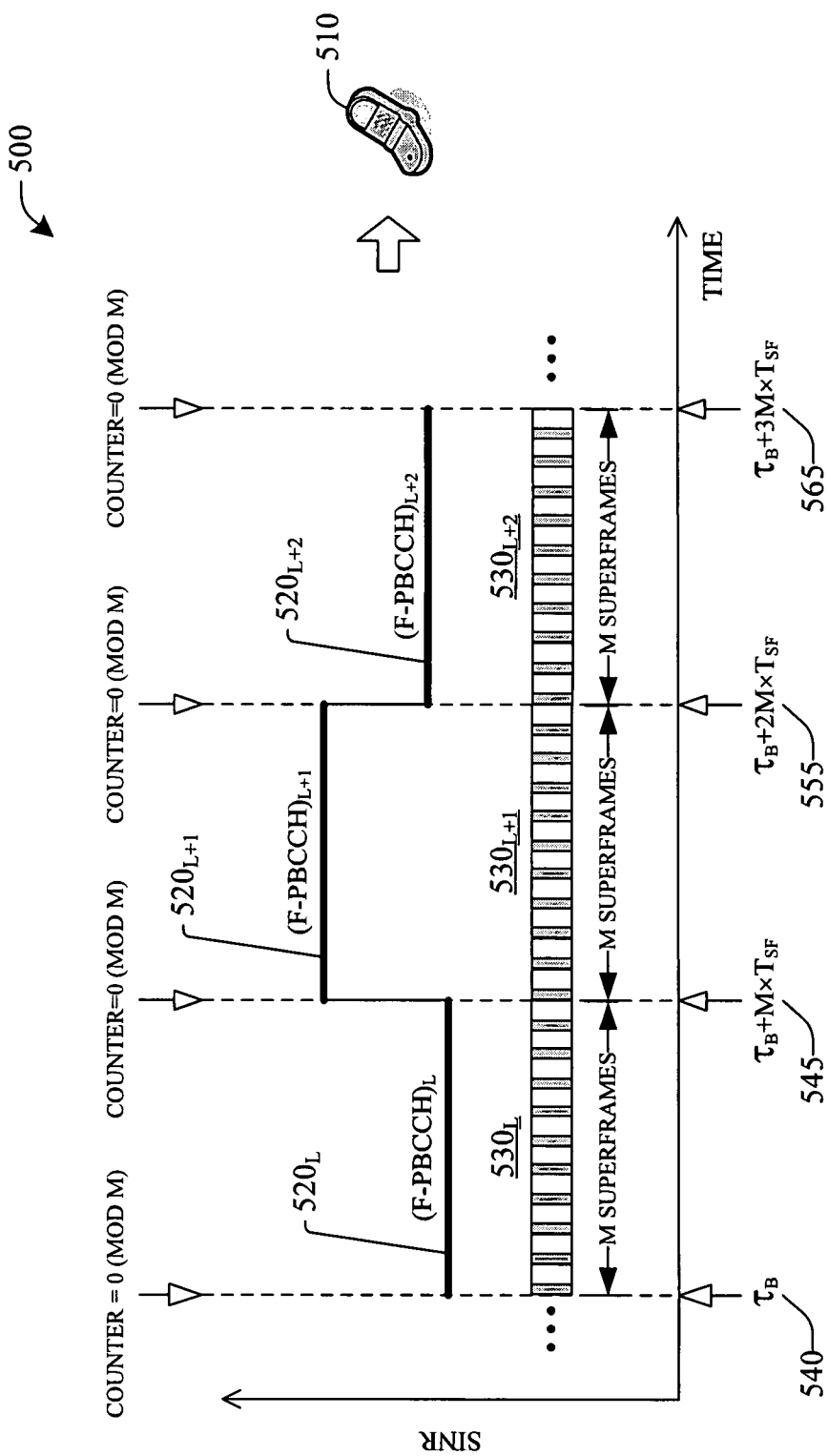
FIG. 5 illustrates a packet boundary detection advantage according to an aspect of the subject specification.
Figure 6:
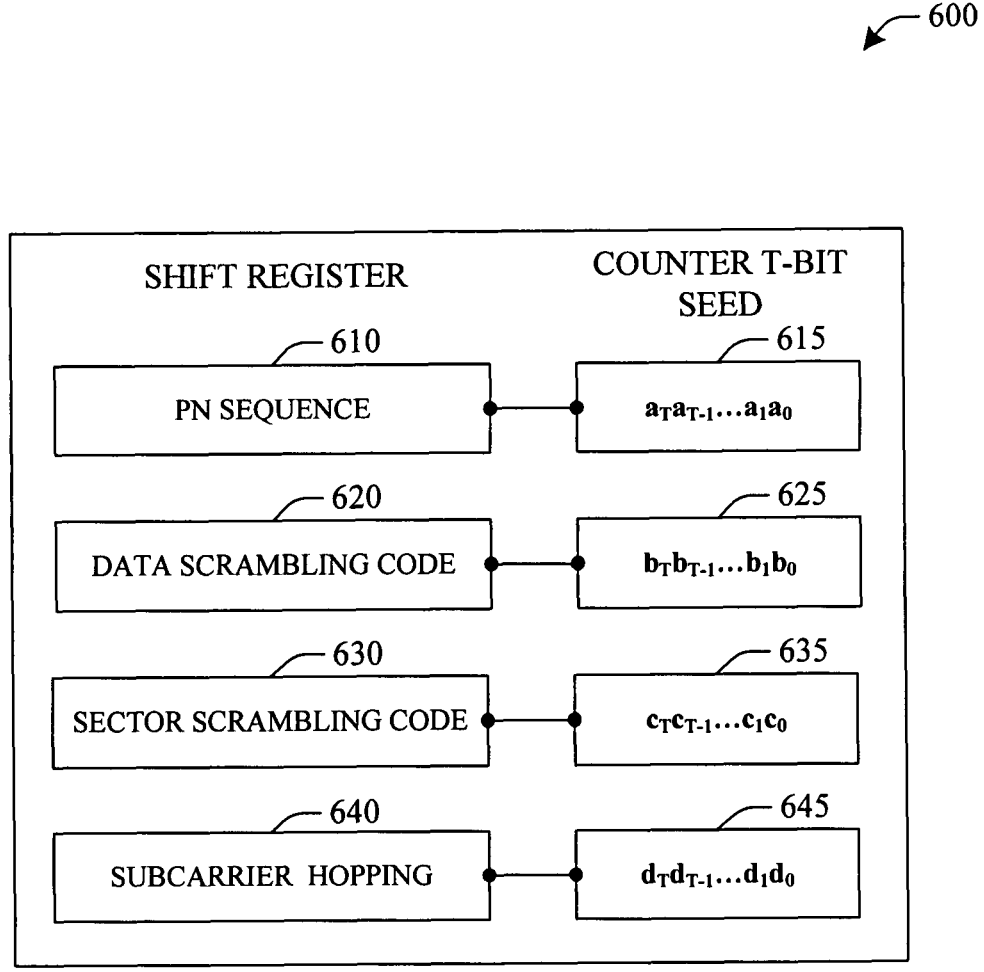
FIG. 6 is a schematic diagram the displays the utilization of a counter index register to initialize various shift registers according to an aspect disclosed herein.

Referring to FIGS. 4-6, they illustrate beneficial aspects of introducing the T-bit counter index within an acquisition pilot as disclosed herein. FIG. 4 is a schematic diagram 400 that illustrates a processing gain that can be attained in an access terminal 410 that conducts sector acquisition and system determination. Terminal 410 conducts a sector search and system determination in a wireless communication system that includes 3 acquisition pilots, wherein at least one pilot is a T-bit enhanced acquisition pilot. As discussed above, in each of a wireless system superframes, a pilot 3 $382_3$ conveys $R_3$ bits of information, and a T-bit counter index which counts transmitted superframes, modulated with a Walsh Sequence 3; Sequence 3 is further scrambled with sector identification, or a sector identifier, information associated with a pilot 2 $328_2$. An access point (not shown) transmits in superframes $430_L$-$430_{L+N}$ corresponding sequences Sequence 3 over an air interface such that changes to SINR (illustrated in abscissa 405) of the conveyed sequences change from sector to sector. The sequences, illustrated as (Pilot 3)$_L$-(Pilot)$_{L+N}$, are received/demodulated by terminal 410. As sequences change over time, due to changes in the counter field, a correlator in terminal 410 (e.g., correlator component 248) can accumulate N time metrics necessary for sector acquisition and system determination. Such accumulation results in a net processing gain at terminal 410, with ensuing improvement in detection of a pilot sequence.

FIG. 5 is a diagram 500 that illustrates a boundary detection advantage associated with the T-bit counter field index that is present in an acquisition pilot (e.g., pilot 3 $328_3$). The advantage is exemplified with a forward primary broadcast control channel (e.g., F-PBCCH) that is transmitted over M superframes (or packets) (it should be appreciated that M=16 in UMB); however, substantially the same advantage is obtained with substantially any control channel. An access terminal 510 can possibly correlate (for example, via a correlator component 248) F-PBCCH over M superframes (e.g., $530_L$, $530_{L+1}$, or $530_{L+2}$). High SINR transmission of those M superframes that carry an F-PBCCH can result in detection and decoding, via sequence correlation, with ensuing time boundary (e.g., $\tau_B$+2M×$T_{SF}$ 555, with $T_{SF}$ time length of a superframe) acquisition—determination of times at which a packet/frame/symbol begins/ends—in fewer than M superframes. It is noted that in FIG. 5, the SINR of transmission over M superframes has been considered time-independent for clarity purposes; however, one of skill in the art would realize that SINR of M superframes is time dependent.

As control information is transmitted in an M-superframe interval, it can be sufficient to establish a counter index with T bits of system time, or superframe index, satisfying M=$2^T$. The latter relationship indicates that the register, or period, of the counter field equals the number of frames, which can be considered the minimum diversity that can afford correlation of the subject control channel. In such a case, an access point (not shown) can establish boundaries between transmissions of disparate F-PBCCH when a null value (in modulo M) for the T-bit counter field is determined—e.g., $\tau_B$ 540, $\tau_B$+M×$T_{SF}$ 545, $\tau_B$+2M×$T_{SF}$ 555, $\tau_B$+3M×$T_{SF}$ 565. It should be appreciated that substantially any predetermined value (mod M) can be employed to establish boundaries between transmissions/packets. In such an instance, a new F-PBCCH packet begins. With respect to detection, a terminal 510 can determine time boundaries for a received control channel packet, such as F-PBCCH, when the T-bit counter reaches zero mod M or substantially any predetermined value of the T-bit counter index. In F-PBCCH in UMB, T=4 bits of system time can be sufficient to correlate the control channel.

FIG. 6 is a schematic diagram 600 the displays the utilization of a T-bit counter field register to initialize various shift registers that can be employed in a wireless communication system. In a similar manner to that in which the sector identifier of pilot 2 $328_2$ (FIG. 2) can be employed to establish a seed for the modulation Sequence 2, other registers can be initialized with the T-bits in the counter field. In an aspect, a pseudonoise register 610 can be initialized with seed '$a_T a_{T-1} \ldots a_2 a_1 a_0$' 615. The magnitude of T can determine the memory length, or period, of register 610. Scrambling codes registers can also be initialized; for instance, data scrambling code 620 and sector ID scrambling code 630 possess, respectively, seeds '$b_T b_{T-1} \ldots b_2 b_1 b_0$' 625 and '$c_T c_{T-1} \ldots c_2 c_1 c_0$' 635. It should be appreciated that for small values of T, the initialization seeds can be combined or concatenated with larger seeds such as a sector identifier seed. In such a case, for a specific sector, the counter seed can produce disparate data and sector identifier scrambling codes through the dependence of the counter field on time. In case of subcarrier hopping register 640, the period of a pseudorandom series can be much smaller than that in a scrambling codes (e.g., 620 and 630). In subcarrier hopping, a seed '$d_T d_{T-1} \ldots d_2 d_1 d_0$' 645 with a small number of bits can be satisfactory in attaining frequency diversity. In an aspect, a 4-bit seed results in a pseudorandom sequence with period 16, and in such a case, hopping patterns repeat every 16 superframes. In an aspect, in UMB, a superframe encompasses 25 frames, thus 16 superframes can lead to 25×16=400 hopping realizations, when concatenating the T bits of the counter index with frame indices labeling the frames within a superframe. Moreover, such a concatenated index can be further expanded to incorporate OFDM symbol indices to achieve additional hopping/scrambling realizations. Such repetition pattern can facilitate demodulating the entire FL waveform even in the presence of multiple users. In the case of hopping patterns, utilization of orthogonal sequences such as Walsh-Hadamard can mitigate interference effects when multiple terminals are served in a single sector. It is noted that hopping and scrambling, which change from frame to frame, and possibly even from OFDM symbol to OFDM symbol, can utilize the frame index within a superframe, or the OFDM symbol index within the frame, to initialize the hopping and/or scrambling registers.

Figure 7:
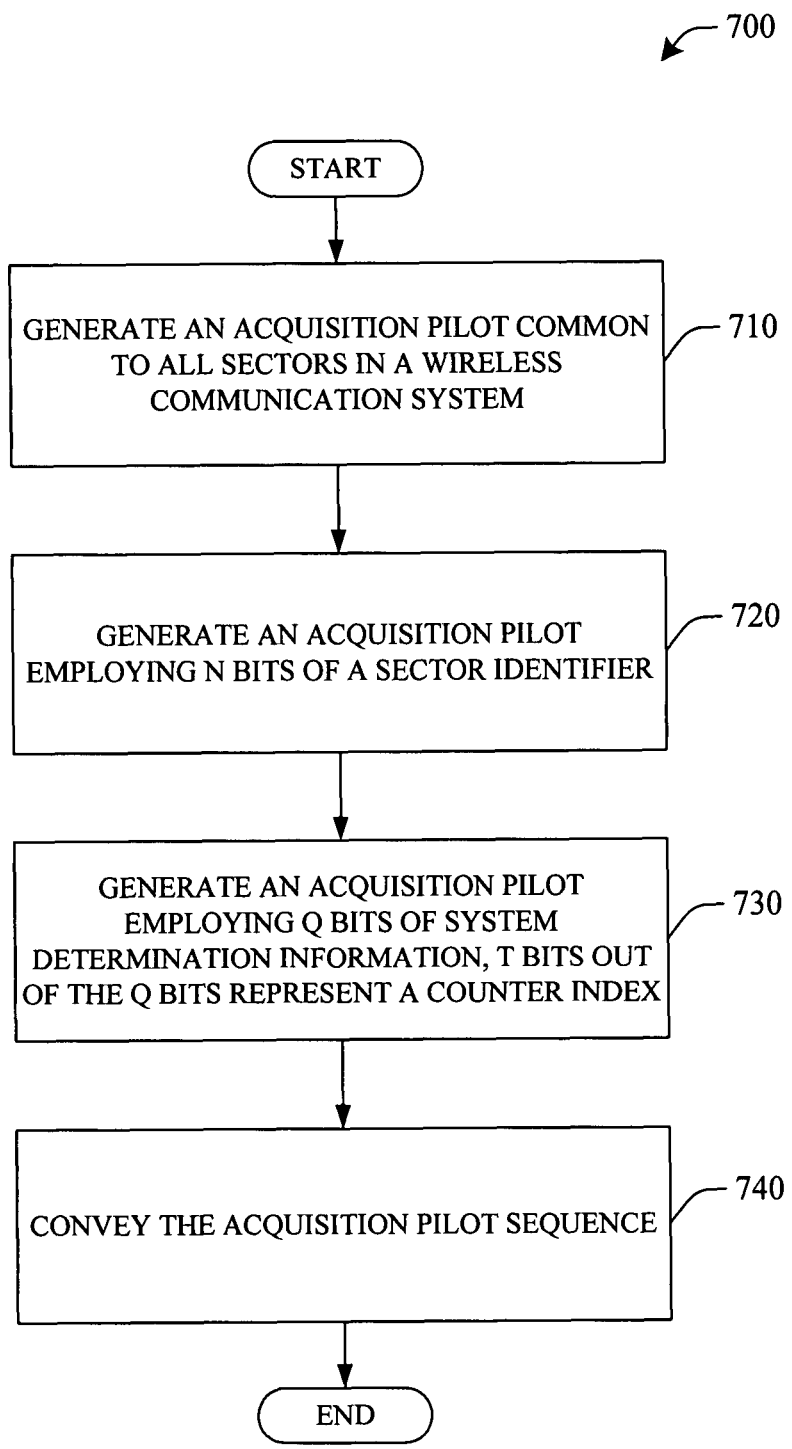
FIG. 7 presents a flowchart of a method for generating acquisition pilots in accordance with various aspects set forth herein.
Figure 8:
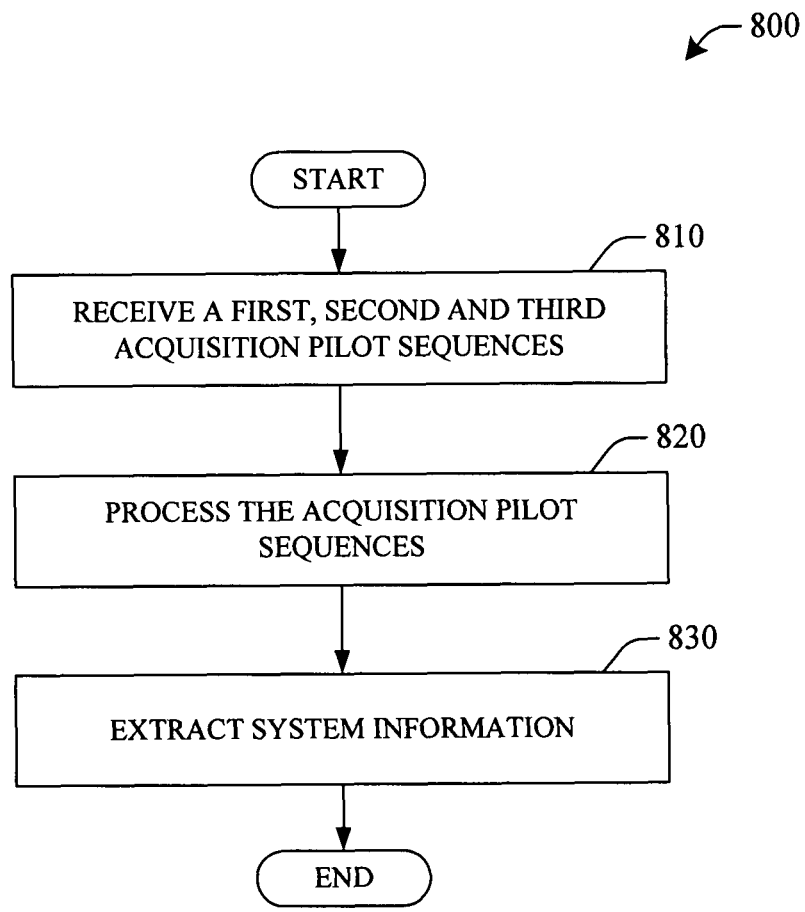
FIG. 8 presents a flowchart of an example method for processing acquisition pilots according to an aspect of the subject specification.

In view of the example systems shown and described above, methodologies that may be implemented in accordance with the disclosed subject matter, will be better appreciated with reference to the flow charts of FIGS. 7 and 8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 7 presents a flowchart of an example method for generating acquisition pilots. At step 710, an acquisition pilot is generated as part of a communication superframe preamble. In an aspect, the acquisition pilot is common to all sectors in a wireless communication system, and the pilot can be a frequency-domain sequence of the generalized Chirp-like type, such as a Zadoff-Chu sequence. The sequence carries information for timing and frequency synchronization. At 720, an acquisition pilot employing N bits of a sector identifier is generated. In an aspect, the pilot sequence is a time-domain orthogonal Walsh-Hadamard sequence. In another aspect, in UMB, N=9 which can convey up to 512 sector identification codes. At step 730, an acquisition pilot is generated employing Q bits of system determination information, including system information such as a bandwidth, a cyclic prefix, an antenna configuration at an access point, etc. T bits of the Q bits employed in the pilot represent a counter index. The T-bit counter index can be updated once a superframe is generated. In an aspect, the pilot sequence can be a time-domain orthogonal Walsh-Hadamard sequence. However, it should be appreciated that other sequences, such as Gold, maximum-length, and exponential sequences can also be suitable for modulation. In another aspect, the Q bits of system information can be scrambled with bits of information of a disparate acquisition pilot (e.g., the N bits of the pilot generated in act 720). At step 740, the acquisition sequences are conveyed over an air interface. Bits can be transmitted by employing one out of multiple codes (e.g., Walsh-Hadamard, Gold, exponential, and so on), or bits can be transmitted by pseudorandom scrambling of an existing pilot.

FIG. 8 presents a flowchart of an example method 800 for processing acquisition pilots for system determination. At 810, a first, a second, and a third acquisition pilot sequence are received. In an aspect, the sequences can be generated by an acquisition pilot generator (e.g., component 213) in an access point (e.g., 210). In another aspect, the sequences can be received in an acquisition processing component (e.g., component 244) in an access terminal, such as 240. At step 820, the acquisition pilot sequences are processed. Processing protocol can be pre-established by an operator, in such a manner that the first sequence is decoded via correlation (e.g., through correlator component 248) with each of a set of code sequences employed to generate the pilot, and timing information and frequency synchronization is extracted. As it is typical in the art, timing and synchronization acquisition takes place in a narrow (e.g., 1.25 MHz) central band of a system bandwidth. In an aspect, the narrow acquisition band determines the number of subcarriers (in OFDM) to be considered during processing of the acquisition sequence, such number typically coincides with the number of Fourier transform terms to be computed. DFT and IFT can be implemented through a processor (e.g., processor 242) in the receiving access terminal. Once the first sequence is processed, the second acquisition pilot is decoded. In an aspect, for a second pilot that N bits of a sector identifier, the signal can be decoded by correlating the pilot sequence with each one of $2^N$ sequences associated with the sector hypothesis afforded by N bits. In another aspect, when the second acquisition pilot corresponds to a Walsh-Hadamard sequence, a Hadamard transform is applied prior to decoding the pilot; when the sequence is one of an exponential code sequence, a Fourier transform is applied prior to decoding. Once the sequence is decoded (for example, via an acquisition processing component 244 and a processor 248). In a subsequent part of processing the acquisition sequences, information extracted from the second sequence is employed to decode the third pilot acquisition sequence. In an aspect, the third pilot sequence can be scrambled with N bits of information of the second pilot sequence, in such an instance, the information decoded at the time of processing the second sequence is employed to descramble the third pilot sequence, and subsequently the third sequence is decoded through correlation, according to the codes employed to generated said sequence. At step 830, system information is extracted from the decoded pilot sequences.

Figure 9:
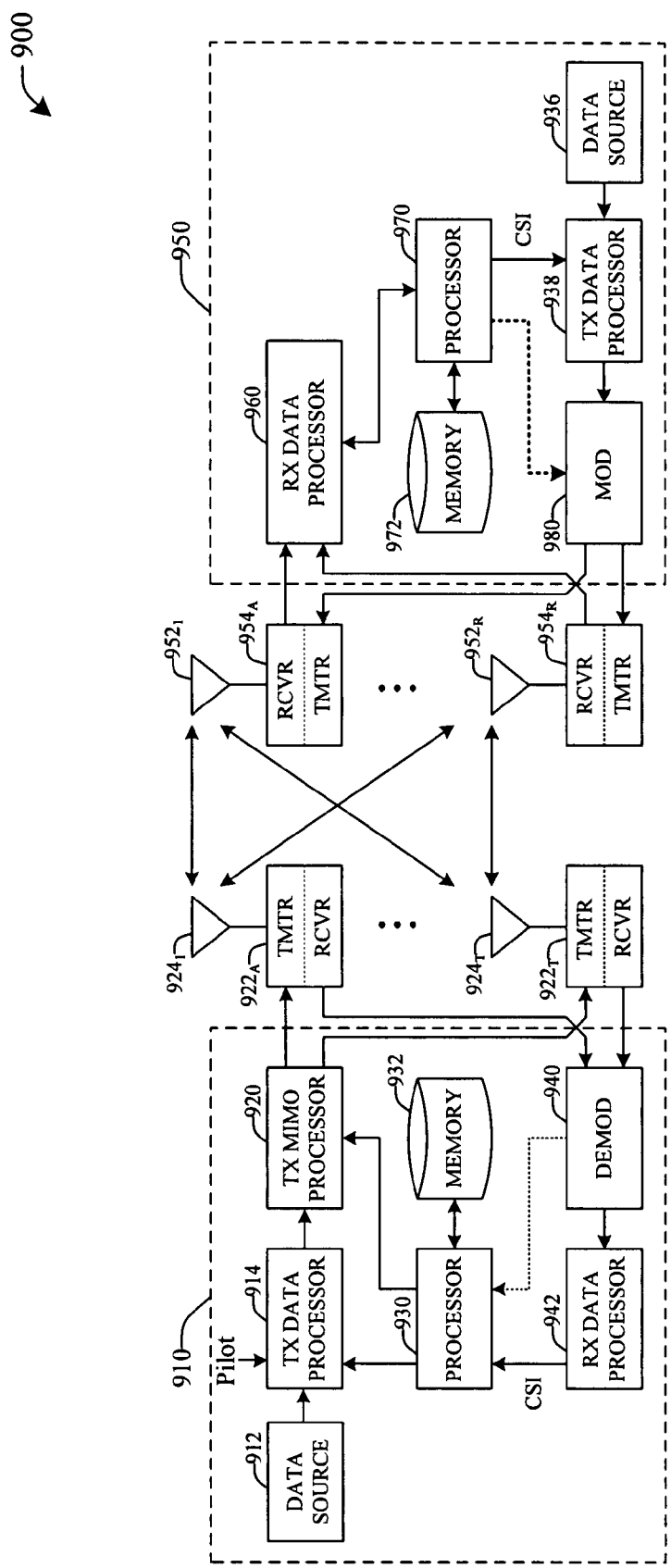
FIG. 9 is a block diagram of an embodiment of a transmitter system and a receiver system in a multiple-input multiple-output operation deployment that provide for cell/sector communication in accordance with one or more aspects set forth herein.

FIG. 9 is a block diagram 900 of an embodiment of a transmitter system 910 (such as access point 210) and a receiver system 950 (e.g., access terminal 240) in a multiple-input multiple-output (MIMO) system that can provide for cell/sector communication in a wireless communication environment in accordance with one or more aspects set forth herein. At the transmitter system 910, traffic data for a number of data streams can be provided from a data source 912 to transmit (TX) data processor 914. In an embodiment, each data stream is transmitted over a respective transmit antenna. TX data processor 914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or m-order quadrature amplitude modulation (M-QAM)) selected for that data stream to provide modulation symbols. The data rate, coding, and modulation for each data stream may be determined by instructions executed by processor 930, the instructions as well as the data may be stored in memory 932.

The modulation symbols for all data streams are then provided to a TX MIMO processor 920, which may further process the modulation symbols (e.g., OFDM). TX MIMO processor 920 then provides $N_T$ modulation symbol streams to $N_T$ transceiver (TMTR/RCVR) 922$_A$ through 922$_T$. In certain embodiments, TX MIMO processor 920 applies beamforming weights (or precoding) to the symbols of the data streams and to the antenna from which the symbol is being transmitted. Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922$_A$ through 922$_T$ are then transmitted from $N_T$ antennas 924$_1$ through 924$_T$, respectively. At receiver system 950, the transmitted modulated signals are received by $N_R$ antennas 952$_1$ through 952$_R$ and the received signal from each antenna 952 is provided to a respective transceiver (RCVR/TMTR) 954$_A$ through 954$_R$. Each transceiver 954$_1$-954$_R$ conditions (e.g., filters, amplifies, and downconverts) a respective received signal, digitizes the conditioned signal to provide samples, and further processes the samples to provide a corresponding "received" symbol stream.

An RX data processor 960 then receives and processes the $N_R$ received symbol streams from $N_R$ transceivers 954$_1$-954$_R$ based on a particular receiver processing technique to provide $N_T$ "detected" symbol streams. The RX data processor 960 then demodulates, deinterleaves, and decodes each detected symbol stream to recover the traffic data for the data stream. The processing by RX data processor 960 is complementary to that performed by TX MIMO processor 920 and TX data processor 914 at transmitter system 910. A processor 970 periodically determines which pre-coding matrix to use, such a matrix can be stored in memory 972. Processor 970 formulates a reverse link message comprising a matrix index portion and a rank value portion. Memory 972 may store instructions that when executed by processor 970 result in formulating the reverse link message. The reverse link message may comprise various types of information regarding the communication link or the received data stream, or a combination thereof. As an example, such information can comprise an adjusted communication resource, an offset for adjusting a scheduled resource, and information for decoding a data packet format. The reverse link message is then processed by a TX data processor 938, which also receives traffic data for a number of data streams from a data source 936, modulated by a modulator 980, conditioned by transceiver 954$_A$ through 954$_R$, and transmitted back to transmitter system 910.

At transmitter system 910, the modulated signals from receiver system 950 are received by antennas 924$_1$-924$_T$, conditioned by transceivers 922$_A$-922$_T$, demodulated by a demodulator 940, and processed by a RX data processor 942 to extract the reserve link message transmitted by the receiver system 950. Processor 930 then determines which pre-coding matrix to use for determining the beamforming weights and processes the extracted message.

Single-user MIMO mode of operation corresponds to the case in which a single receiver system 950 communicates with transmitter system 910, as illustrated in FIG. 9 and according to the operation described above. In such a system, the $N_T$ transmitters 924$_1$-924$_T$ (also known as TX antennas) and $N_R$ receivers 952$_1$-952$_R$ (also known as RX antennas) form a matrix channel (e.g., Rayleigh channel, or Gaussian channel) for wireless communication. The SU-MIMO channel is described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to $\min\{N_T, N_R\}$. A MIMO channel formed by the $N_T$ transmit and $N_R$ receive antennas may be decomposed into $N_V$ independent channels, which are also referred to as spatial channels, where $N_V \leq \min\{N_T, N_R\}$ Each of the $N_V$ independent channels corresponds to a dimension.

In one aspect, transmitted/received symbols with OFDM, at tone ω, can be modeled by:

$$y(\omega) = H(\omega)c(\omega) + n(\omega). \qquad (1)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 910, and $N_V$ can be scheduled at the discretion of the transmitter (e.g., access point 250) based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 910 allocates to transmit each data stream $N_V$. It should be appreciated that such a power gain matrix can be a resource that is assigned to access terminal 240, and it can be managed through adjustment of offsets as described herein. In view of the FL/RL reciprocity of the wireless channel, it should be appreciated that a transmission from MIMO receiver 950 can also be modeled in the fashion of Eq. (1), including substantially the same elements. In addition, receiver 950 can also apply precoding schemes prior to transmitting data in the reverse link.

In system 900 (FIG. 9), when $N_T=N_R=1$, the system reduces to a single-input single-output (SISO) system that can provide for sector communication in a wireless communication environment in accordance with one or more aspects set forth herein.

Figure 10:
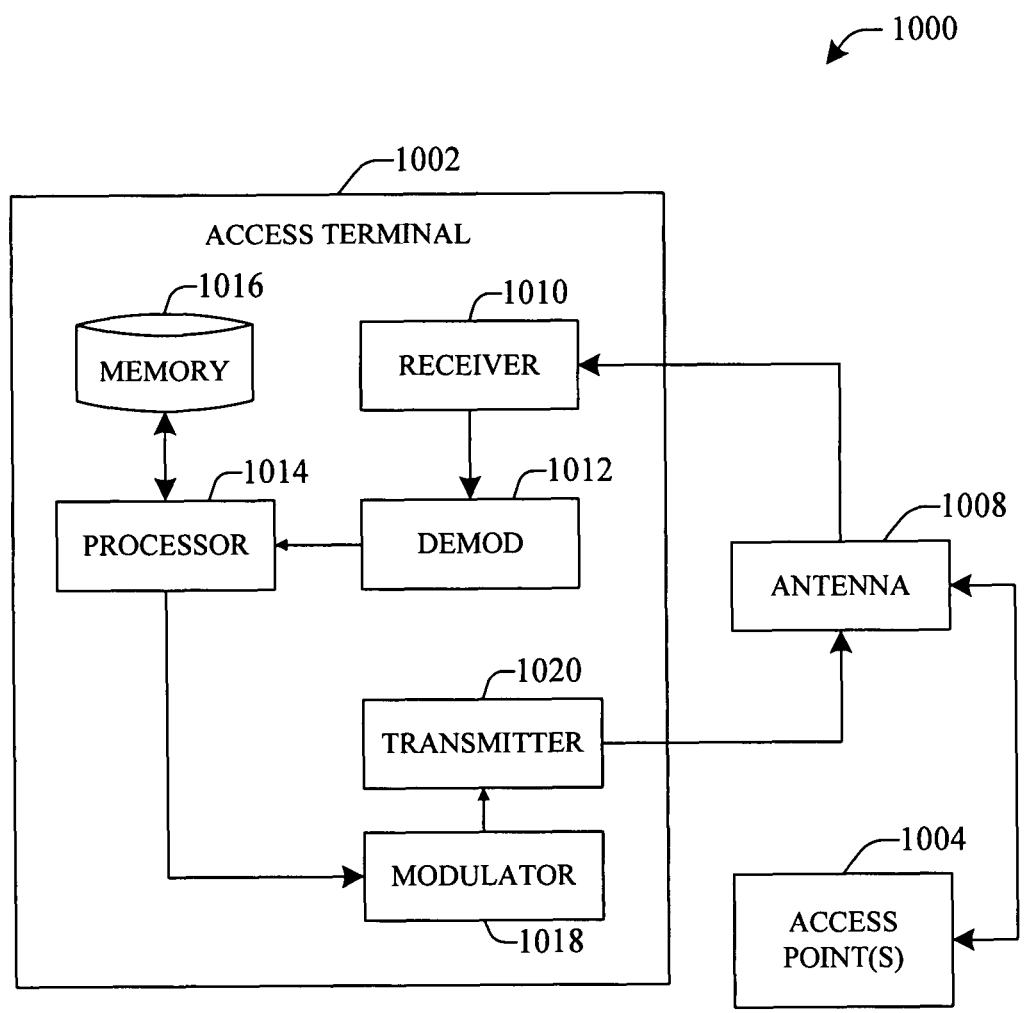
FIG. 10 is a block diagram of a system that receives and processes acquisition pilots in accordance with various aspects described in the subject specification.

FIG. 10 is a block diagram of an example system 1000 that receives and processes acquisition pilots in a wireless communication environment in accordance with various aspects described herein. In one example, system 1000 includes an access terminal 1002. As illustrated, access terminal 1002 can receive signal(s) from one or more access points 1004 and transmit to the one or more access points 1004 via an antenna 1008. Additionally, access terminal 1002 can comprise a receiver 1010, or substantially any other electronic appliance, that receives information from antenna 1008. In one example, receiver 1010 can be operatively associated with a demodulator (Demod) 1012 that demodulates received information. Demodulated symbols can then be analyzed by a processor 1014. Processor 1014 can be coupled to memory 1016, which can store data and/or program codes related to access terminal 1002. Additionally, access terminal 1002 can employ processor 1014, or substantially any other electronic appliance, to perform methodologies 700, 800, and/or other appropriate methodologies. Access terminal 1002 can also include a modulator 1018 that can multiplex a signal for transmission by a transmitter 1020 via antenna 1008 to one or more access points 1004.

Figure 11:
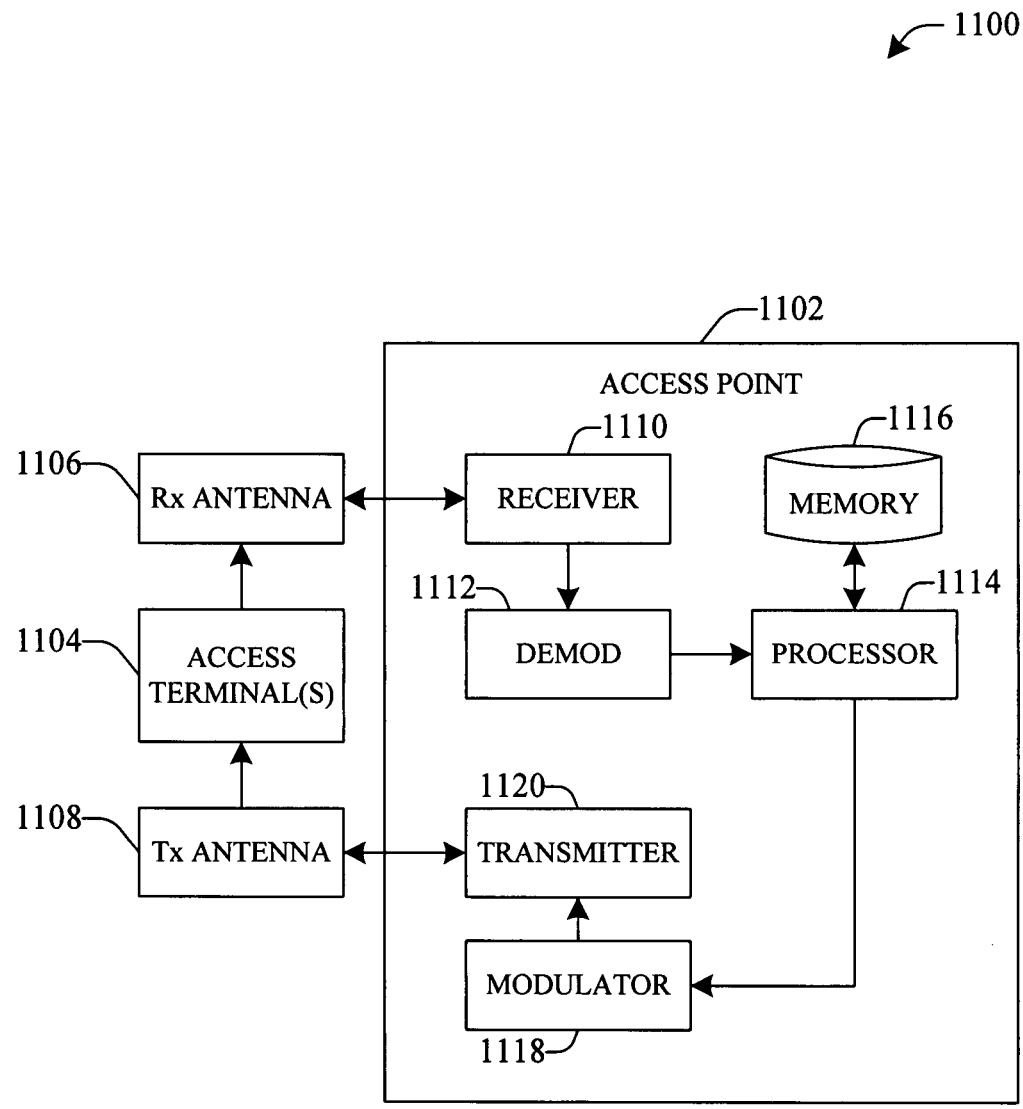
FIG. 11 is a block diagram of a system that generates acquisition pilots and conveys the generated pilots in a wireless communication environment according to various aspects described herein.

FIG. 11 is a block diagram of an example system 1100 that coordinates reverse link communication resources and generates and conveys acquisition pilots in a wireless communication system in accordance with various aspects described herein. In one example, system 1100 includes a base station or access point 1102. As illustrated, access point 1102 can receive signal(s) from one or more access terminals 1104 via a receive (Rx) antenna 1106 and transmit to the one or more access terminals 1104 via a transmit (Tx) antenna 1108.

Additionally, access point 1102 can comprise a receiver 1110 that receives information from receive antenna 1106. In one example, the receiver 1110 can be operatively associated with a demodulator (Demod) 1112, or substantially any other electronic appliance, that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. Access point 1102 can also include a modulator 1118 that can multiplex a signal for transmission by a transmitter 1120 through transmit antenna 1108 to one or more access terminals 11104.

Next, systems that can enable aspects of the disclosed subjected matter are described in connection with FIGS. 12 and 13. Such systems can include functional blocks, which can be functional blocks that represent functions implemented by a processor or an electronic machine, software, or combination thereof (e.g., firmware).

Figure 12:
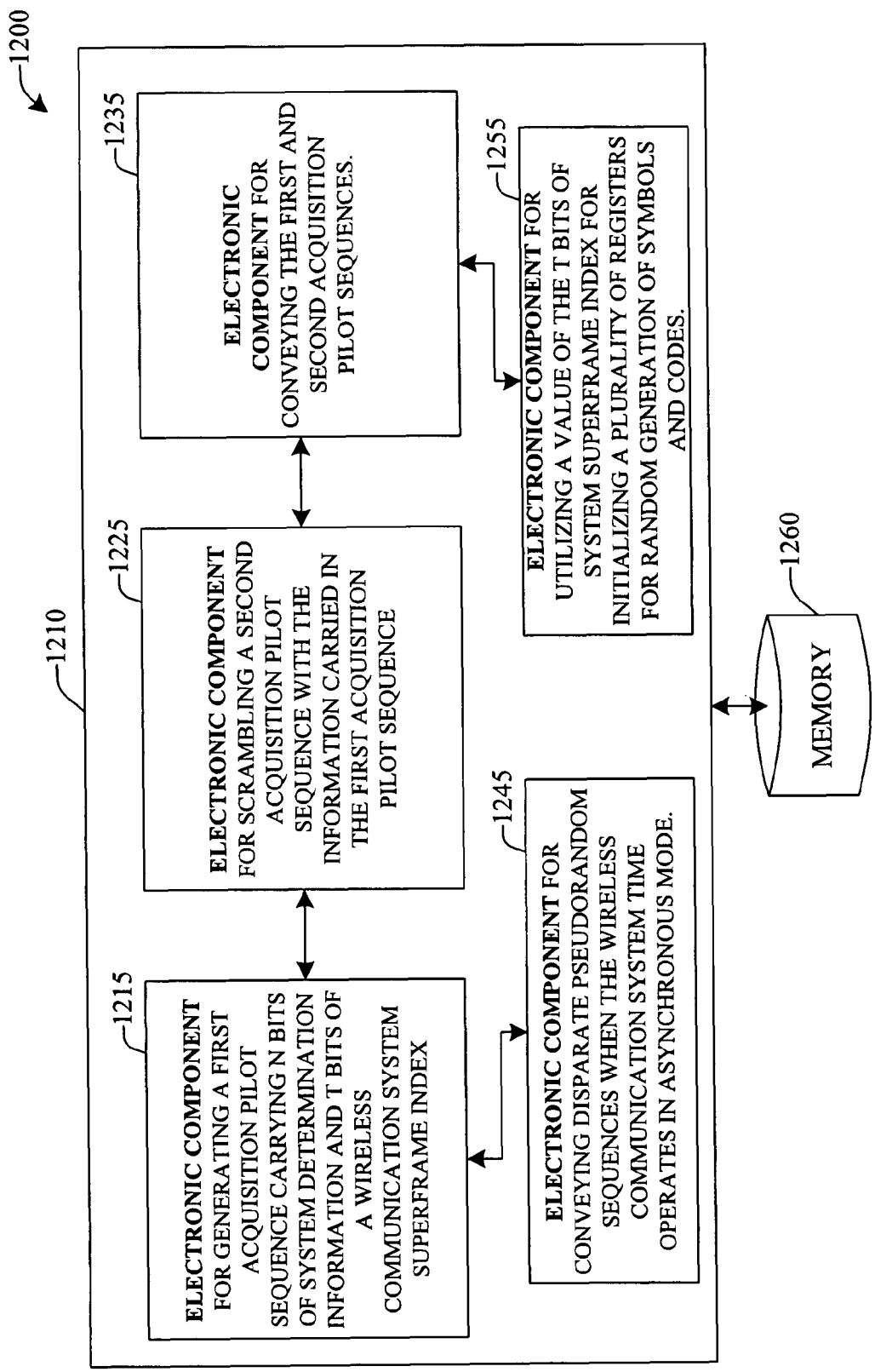
FIG. 12 illustrates a block diagram of an example system that enables generation of acquisition pilot generation in a wireless communication in accordance with aspects of the subject disclosure.

FIG. 12 illustrates a block diagram of an example system that enables generation of modulation sequences related to acquisition pilot generation in a wireless communication in accordance with aspects of the subject disclosure. System 1200 can reside, at least partially, within a wireless base station (e.g., access point 210). System 1200 includes a logical grouping 1210 of electronic components that can act in conjunction. In an aspect, logical grouping 1210 includes an electronic component 1215 for generating a first acquisition pilot sequence carrying N bits of system determination information and T bits of a wireless communication system superframe index; an electronic component 1225 for scrambling a second acquisition pilot sequence with the information carried in the first acquisition pilot sequence; and an electronic component 1235 for conveying the first and second acquisition pilot sequences. In addition, system 1200 can include electronic component 1255 for conveying disparate pseudo-random sequences when the wireless communication system time operates in asynchronous mode, and electronic component 1245 for utilizing a value of the T bits of system time for initializing a plurality of registers for random generation of symbols and codes.

System 1200 can also include a memory 1260 that retains instructions for executing functions associated with electrical components 1215, 1225, 1235, 1245, 1255, as well as measured and computed data that may be generated during executing such functions. While shown as being external to memory 1260, it is to be understood that one or more of electronic components 1215, 1225, and 1235, 1245, and 1255 can exist within memory 1260.

Figure 13:
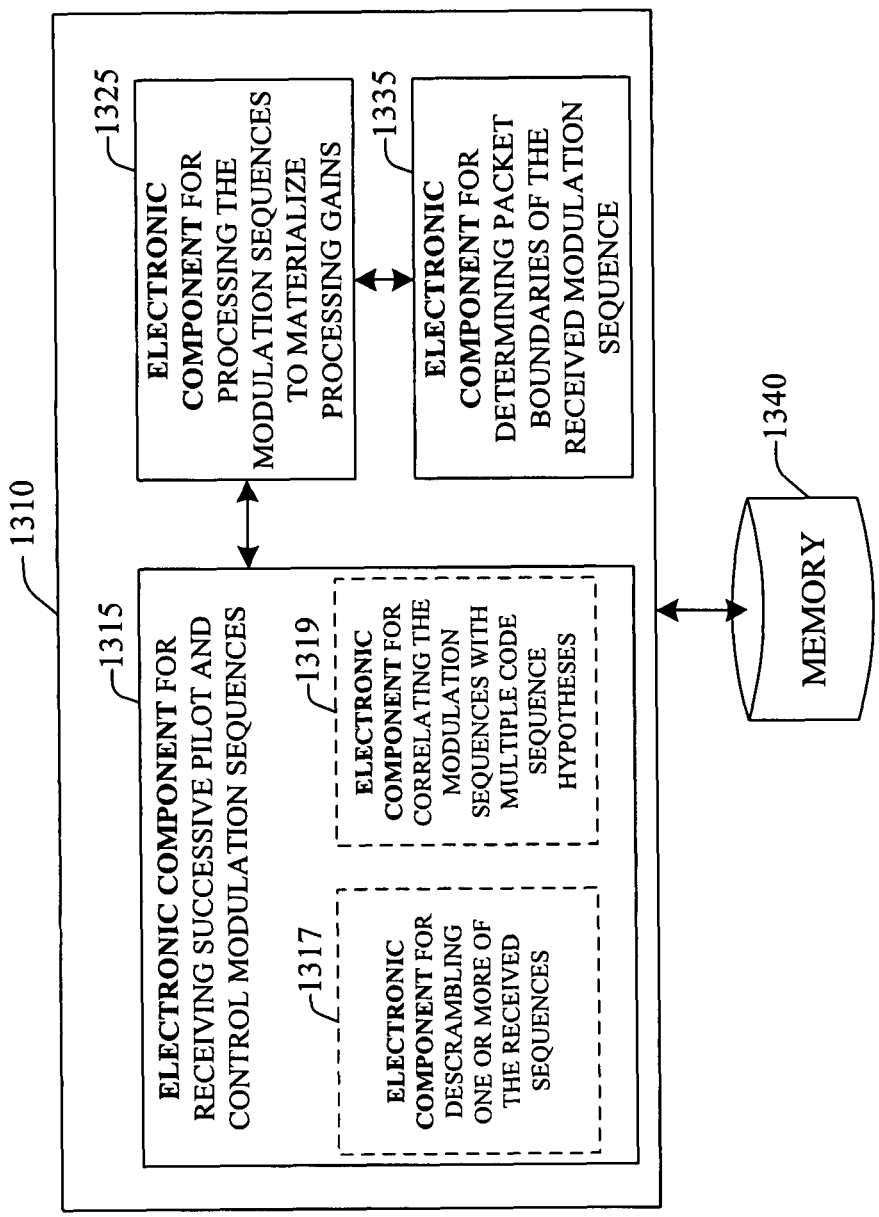
FIG. 13 illustrates a block diagram of an example system that enables acquisition pilot modulation sequences processing in a wireless system in accordance with an aspect of the subject disclosure.

FIG. 13 illustrates a block diagram of an example system that enables acquisition pilot modulation sequences processing in a wireless system in accordance with an aspect of the subject disclosure. System 1300 can reside, at least partially, within a wireless base station (e.g., access point 210). System 1300 includes a logical grouping 1310 of electronic components that can act in conjunction. In an aspect, logical grouping 1310 includes an electronic component 1315 for receiving successive pilot and control modulation sequences, which can also include an electronic component 1317 for descrambling one or more of the received sequences and an electronic component 1319 for correlating the modulation sequences with multiple code sequence hypotheses; electronic component 1325 for processing the modulation sequences to materialize processing gains; and an electronic component 1335 for determining packet boundaries of the received modulation sequence.

System 1300 can also include a memory 1340 that retains instructions for executing functions associated with electrical components 1315, 1325 and 1335, as well as measured and computed data that may be generated during executing such functions. While shown as being external to memory 1340, it is to be understood that one or more of electronic components 1315, 1325, and 1335 can exist within memory 1340.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for generating acquisition pilots in a wireless communication system that employs a superframe structure having a preamble followed by a series of physical layer frames, comprising:
   generating as part of the preamble an acquisition pilot that contains N bits of information, wherein the acquisition pilot permits acquisition of information needed to demodulate contents of the preamble, and wherein T of the N bits of information define a counter index, N and T being positive integer numbers; and
   conveying the acquisition pilot.

2. The method of claim 1, wherein the T-bit counter index indicates a count of transmitted superframes.

3. The method of claim 1, wherein the T-bit counter index corresponds to T least significant bits of the superframe index.

4. The method of claim 1, further comprising employing the T-bit counter index to generate modulation sequences that vary from a first superframe to a second superframe when the wireless communication system operates in asynchronous mode.

5. The method of claim 1, further comprising employing the T-bit counter index value as part of an initialization seed for a pseudonoise register.

6. The method of claim 1, further comprising employing the T-bit counter index value as part of an initialization seed for a data scrambling register.

7. The method of claim 1, further comprising employing the T-bit counter index value as part of an initialization seed for a sector identifier scrambling register.

8. The method of claim 1, further comprising employing the T-bit counter index value as part of an initialization seed for a subcarrier hopping register.

9. The method of claim 1, further comprising conveying a control channel packet over M superframes and establishing the packet boundary through identifying a time in which the T-bit counter field is a predetermined value in mod M, wherein M is a positive integer satisfying $2^T=M$.

10. The method of claim 1, wherein the acquisition pilot is at least one of a time-domain Walsh-Hadamard sequence, a Gold sequence, a Rice sequence, a Golomb sequence, an M-sequence, a pseudonoise sequence, or a generalized Chirp-like sequence.

11. The method of claim 1, wherein the acquisition pilot permits acquisition of information associated with one of system bandwidth, frequency reuse, and an access point antenna.

12. The method of claim 1, further comprising scrambling the acquisition pilot with information carried in a disparate acquisition pilot that conveys a sector identifier information.

13. The method of claim 12, wherein the disparate acquisition pilot is at least one of a time-domain Walsh-Hadamard sequence, a Gold sequence, a Rice sequence, a Golomb sequence, an M-sequence, or a generalized Chirp-like sequence.

14. The method of claim 1, conveying the acquisition pilot includes selecting an orthogonal code to convey Q bits of the N bits of information in the acquisition pilot, and using the remaining N-Q bits to generate a pseudorandom scrambling sequence, and further scrambling the orthogonal code with the scrambling sequence.

15. The method of claim 1, wherein the number of bits in the T-bit counter index is four.

16. An apparatus that operates in a wireless communication system employing a superframe structure having a preamble followed by a series of physical layer frames, the apparatus comprising:
- at least one processor configured to generate an acquisition pilot sequence as part of the preamble, wherein the acquisition pilot sequence contains bits that define a counter field value associated with a superframe transmission and, and wherein the acquisition pilot sequence permits acquisition of information needed to demodulate contents of the preamble; and
- a memory coupled to the at least one processor.

17. The apparatus of claim 16, wherein the counter field value is determined by T bits.

18. The apparatus of claim 16, wherein the processor further configured to utilize the counter field value to initialize at least one of a pseudonoise register, a data scrambling register, a sector scrambling register, a sector hopping register, or a subcarrier hopping register.

19. The apparatus of claim 16, wherein the acquisition pilot sequence is at least one of a Walsh-Hadamard sequence, a Gold code, or a pseudonoise sequence, a Rice sequence, a Golomb sequence, an M-sequence, or a generalized Chirp-like sequence.

20. The apparatus of claim 16, wherein the preamble includes a further acquisition sequence to support sector acquisition, and wherein an initialization seed of the further acquisition sequence depends on a sector identifier.

21. The apparatus of claim 16, wherein the acquisition pilot sequence permits acquisition of information associated with one of system bandwidth, frequency reuse, and an access point antenna.

22. The apparatus of claim 16, wherein the acquisition pilot sequence is scrambled with G bits of information in a disparate acquisition pilot sequence, G a positive integer number.

23. The apparatus of claim 22, wherein the disparate acquisition pilot sequence carries a sector identifier.

24. The apparatus of claim 22, wherein the disparate acquisition pilot sequence is at least one of a Walsh-Hadamard sequence, a Gold code, or a pseudonoise sequence, a Rice sequence, a Golomb sequence, an M-sequence, or a generalized Chirp-like sequence.

25. A wireless communication device comprising:
- means for generating a first acquisition pilot sequence that contains N bits of system determination information and T bits that define at least a portion of a wireless communication system superframe index;
- means for scrambling a second acquisition pilot sequence with a group of bits contained in the first acquisition pilot sequence that contained the T bits; and
- means for conveying the first and second acquisition pilot sequences.

26. The wireless communication device of claim 25, further comprising means for utilizing a value of the T bits of system superframe index to initialize a plurality of registers that generate symbols and codes.

27. The wireless communication device of claim 25, further comprising means for conveying disparate pseudorandom sequences when the wireless communication system time operates in asynchronous mode.

28. A computer program product, comprising a non-transitory computer-readable medium comprising:
- code for causing at least one computer to generate, as part of a preamble in a superframe structure having a series of physical layer frames that follow the preamble, an acquisition pilot sequence that contains N bits of information, wherein T of the N bits of information define a counter field, and wherein the acquisition pilot sequence permits acquisition of information needed to demodulate contents of the preamble; and
- code for causing the at least one computer to convey the acquisition pilot.

29. A method for processing acquisition pilots in a wireless communication system, the method comprising:
- receiving a plurality of pilot acquisition sequences that contain respective pluralities of bits, wherein one of the pilot acquisition sequences is scrambled with a group of bits contained in another of the pilot acquisition sequences, the another of the pilot acquisition sequences containing T bits that define at least a portion of a wireless communication system superframe index; and
- processing the plurality of pilot acquisition sequences to extract system determination information.

30. The method of claim 29, wherein the received plurality of pilot acquisition sequences includes at least one of a time-domain Walsh-Hadamard sequence, a Gold sequence, a Rice sequence, a Golomb sequence, an M-sequence, a pseudonoise sequence, or a frequency-domain generalized Chirp-like sequence.

31. The method of claim 29, wherein receiving a plurality of pilot acquisition sequences includes receiving a T-bit counter index associated with a superframe index, T being a positive integer.

32. The method of claim 31, further comprising receiving a control channel packet over M superframes and determining the packet boundary through identifying a time in which the T-bit counter index is a predetermined value in mod M, wherein M is a positive integer satisfying $2^T=M$.

33. The method of claim 29, processing the plurality of pilot acquisition sequences includes correlating with each of a plurality of sequences available to generate the pilot acquisition sequence.

34. The method of claim 33, correlating with each of a plurality of sequences available to generate the pilot acquisition sequence includes employing a Hadamard transformation for a received Walsh-Hadamard sequence, and a Fourier transformation for exponential received sequences.

35. The method of claim 33, correlating with each of a plurality of sequences available to generate the pilot acquisition sequence includes employing a Fourier transformation for a received exponential code sequence.

36. The method of claim 29, processing the plurality of pilot acquisition sequences includes descrambling a pilot acquisition sequence with information decoded from a disparate pilot acquisition sequence.

37. The method of claim 36, descrambling a pilot acquisition sequence includes employing the received T-bit counter index for generating seeds for scrambling sequences, and utilizing the scrambling sequences to descramble information transmitted in the pilot acquisition sequence.

38. The method of claim 29, processing the plurality of pilot acquisition sequences includes combining a pilot sequence over multiple superframes for improving detection performance.

39. A computer program product, comprising a non-transitory computer-readable medium comprising:
- code for causing at least one computer to receive a plurality of pilot acquisition sequences that contain respective pluralities of bits, wherein one of the pilot acquisition sequences is scrambled with a group of bits contained in another of the pilot acquisition sequences, the another of the pilot acquisition sequences containing T bits that define at least a portion of a wireless communication system superframe index; and code for causing the at least one computer to decode the plurality of pilot acquisition sequences to extract system determination information.

40. The computer program product of claim 39, the non-transitory computer-readable medium further comprising code for causing the at least one computer to perform a Hadamard transformation for a received Walsh-Hadamard sequence and a Fourier transformation for a received exponential code sequence.

41. The computer program product of claim 39, the non-transitory computer-readable medium further comprising code for causing the at least one computer to descramble a pilot acquisition sequence with information decoded from a disparate pilot acquisition sequence.

42. A wireless communication device that employs a superframe structure having a preamble followed by a series of physical layer frames comprising:
  at least one processor configured to receive a pilot acquisition sequence that is contained in the preamble and contains system determination information and T bits that define at least a portion of a superframe index, to process the pilot acquisition sequence, and to extract the system determination information, wherein the pilot acquisition sequence permits acquisition of information needed to demodulate contents of the preamble; and
  a memory coupled to the at least one processor.

43. The wireless communication device of claim 42, wherein the pilot acquisition sequence is at least one of a time-domain Walsh-Hadamard sequence, a Gold sequence, a Rice sequence, a Golomb sequence, an M-sequence, a pseudonoise sequence, or a frequency-domain generalized Chirp-like sequence.

44. The wireless communication device of claim 42, wherein the system determination information and T bits of the superframe index are scrambled with sector identifier information carried by a disparate pilot acquisition sequence.

45. The wireless communication device of claim 42, wherein to extract the information includes performing a Hadamard transformation or a Fourier transformation prior to correlating the sequence with multiple code hypotheses.

46. The wireless communication device of claim 42, wherein the T bits of the superframe index correspond to T least significant bits of the superframe index.

47. The wireless communication device of claim 42, wherein to process the pilot acquisition sequence includes to accumulate the pilot acquisition sequence over multiple superframes for improving detection performance.

48. The wireless communication device of claim 42, wherein to extract the information includes to determine a received packet boundary through identification of a time in which a counter associated with the T bits of the superframe index is null in mod M, wherein M is a positive integer satisfying $2^T=M$.

* * * * *